No. 712,378. Patented Oct. 28, 1902.
J. G. HESS.
VEHICLE RUNNING GEAR.
(Application filed Feb. 6, 1902.)
(No Model.)
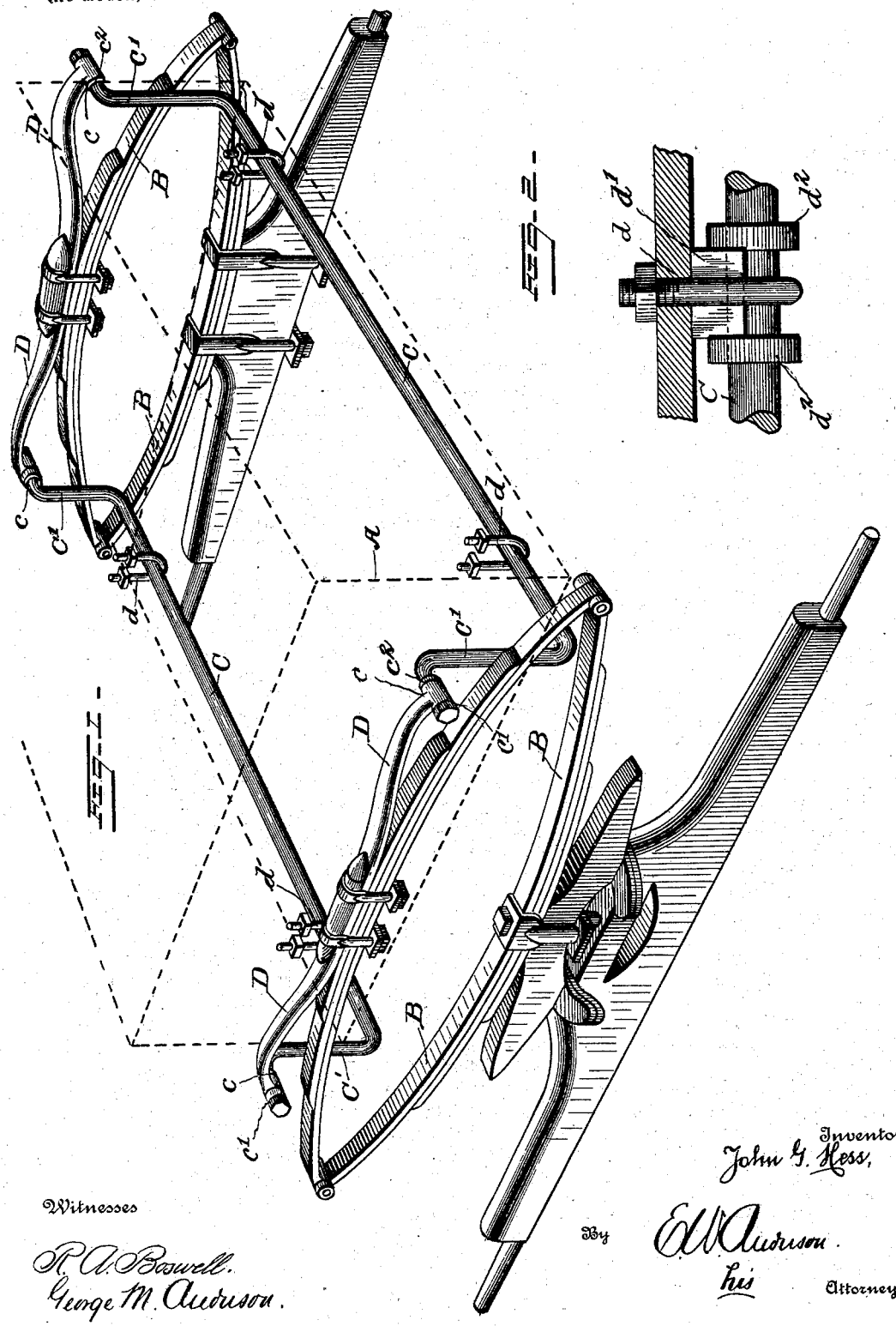

UNITED STATES PATENT OFFICE.

JOHN G. HESS, OF HAGERSTOWN, MARYLAND.

VEHICLE RUNNING-GEAR.

SPECIFICATION forming part of Letters Patent No. 712,378, dated October 28, 1902.

Application filed February 6, 1902. Serial No. 92,828. (No model.)

*To all whom it may concern:*

Be it known that I, JOHN G. HESS, a citizen of the United States, and a resident of Hagerstown, in the county of Washington and State of Maryland, have made a certain new and useful Invention in Running-Gear for Vehicles; and I declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a perspective view showing my invention as applied. Fig. 2 is a sectional detail view of the bearing for rods C.

This invention has relation to running-gear for four-wheeled vehicles, and has for its object the provision of an improved connection of the vehicle-body with the springs for the purpose of reducing strain upon the vehicle generally, and with particular reference to the wheels and to lessen the jar of travel to the occupants.

With this object in view the invention consists in the novel construction and combination of parts, all as hereinafter described, and pointed out in the appended claim.

Referring to the accompanying drawings, the letter A designates the body of the vehicle, and B the springs thereof at front and rear.

C designates lateral bars or rods of strong metal and having upwardly-extending crank-arms C' at front and rear and provided at their free ends with pivotal connections at $c$, with the ends of transverse bars D clipped to the vehicle-springs. In the depending seat formed by these cranked side bars is hung the vehicle-body, which has a pivotal connection with such bars by means of clips $d$.

The lateral bars or rods C may extend continuously between their cranks, as shown in the drawings, or may be separate between the cranks of each bar in case the wheel-box or other obstruction intervenes.

It will thus be seen that under shock or jar upon the wheels in travel the vehicle-body and its occupants or load, being free to swing to one side or the other by my invention and being free to move up and down, owing to the vehicle-springs, will be materially relieved of abrupt jars or shocks, with much greater comfort to the occupants and lessened strain upon the vehicle as a whole.

In Fig. 2 I have illustrated my special form of connection of wagon-body and rods C. In this form of connection the bearing-blocks $d'$ are located between the wagon-body and the rods and braced in position by collars $d^2$ upon each side thereof and carried by the rods. In this way endwise movement of the wagon-body in either direction with relation to the rods C, with consequent abutment against and wear of the upright end portions of said rods, is effectually prevented, such bearing-blocks also taking up the wear of pivotal movement of such rods and relieving the wagon-body of the same. At the same time the collars $c^2$ upon the forward journal extensions $c'$ of the rods C will prevent contact of the upright end portions C' with the transverse bars D and the vehicle-springs under strain, with consequent relief of wear.

Having thus described my invention, what I claim as new, and desire to secure by Letters Patent, is—

In running-gear for vehicles, the combination with the longitudinal swing-bars, spanning the entire length of the wagon-body, and extending beyond the same in front and rear, and having the vertical cranked end portions provided with journal extensions engaging bearings of the front and rear transverse spring-bars, of the journal-bearings of the body projecting downward therefrom, and the double stop-collars of the swing-bars respectively in front and in rear of said bearings, substantially as specified.

In testimony whereof I affix my signature in presence of two witnesses.

JOHN G. HESS.

Witnesses:
HERBERT C. EMERY,
GEORGE M. ANDERSON.